United States Patent
Lengeling et al.

(10) Patent No.: US 10,055,046 B2
(45) Date of Patent: *Aug. 21, 2018

(54) TOUCH-SENSITIVE ELECTRONIC APPARATUS FOR MEDIA APPLICATIONS, AND METHODS THEREFOR

(71) Applicant: Apple Inc., Cupertino, CA (US)

(72) Inventors: Gerhard Lengeling, Los Altos, CA (US); Jonathan J. Rubinstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/700,002

(22) Filed: Apr. 29, 2015

(65) Prior Publication Data

US 2015/0234530 A1    Aug. 20, 2015

Related U.S. Application Data

(63) Continuation of application No. 11/015,978, filed on Dec. 17, 2004, now Pat. No. 9,024,884.

(Continued)

(51) Int. Cl.
*G06F 3/041* (2006.01)
*G06F 3/0484* (2013.01)
*G06F 3/0488* (2013.01)

(52) U.S. Cl.
CPC ........ *G06F 3/0416* (2013.01); *G06F 3/04842* (2013.01); *G06F 3/04845* (2013.01);
(Continued)

(58) Field of Classification Search
CPC ............. G06F 3/04886; G06F 3/04847; G06F 3/0416; H04H 60/00
See application file for complete search history.

(56) References Cited

U.S. PATENT DOCUMENTS 4,550,221 A    10/1985 Mabusth
4,746,770 A    5/1988 Mcavinney
(Continued)

FOREIGN PATENT DOCUMENTS

DE    10042300 A1    3/2002
EP    0664504 A2    7/1995
(Continued)

OTHER PUBLICATIONS

Extended European Search Report (includes Partial European Search Report and European Search Opinion) received for European Patent Application No. 05254654.6, dated Mar. 31, 2006, 8 pages.

(Continued)

*Primary Examiner* — Alexander Eisen
*Assistant Examiner* — Mansour M Said
(74) *Attorney, Agent, or Firm* — Dentons US LLP (57) ABSTRACT

Described herein are devices, methods and computer readable media that allow a device with a touch-screen to respond to different pressure inputs. For example, while the device displays a plurality of media controls on the touch screen, it detects a gesture at a location corresponding to a respective medial control. In accordance with a determination that the gesture meets first pressure criteria, the device performs a first media operation associated with the respective media control; and in accordance with a determination that the gesture meets second pressure criteria different from the first pressure criteria, the device performs a second media operation associated with a second media control that is different from the first media operation.

21 Claims, 6 Drawing Sheets

Related U.S. Application Data (60) Provisional application No. 60/592,483, filed on Jul. 30, 2004.

(52) U.S. Cl.
CPC ...... *G06F 3/04847* (2013.01); *G06F 3/04886* (2013.01); *G06F 2203/04104* (2013.01); *G06F 2203/04808* (2013.01); *G06F 2203/04809* (2013.01)

(56) References Cited

U.S. PATENT DOCUMENTS

| | | | |
|---|---|---|---|
| 4,914,624 A | | 4/1990 | Dunthorn |
| 5,027,689 A | | 7/1991 | Fujimori |
| 5,053,585 A | | 10/1991 | Yaniger |
| 5,327,163 A | | 7/1994 | Hashimoto et al. |
| 5,483,261 A | * | 1/1996 | Yasutake ............ G06K 9/00335 178/18.03 |
| 5,559,301 A | * | 9/1996 | Bryan, Jr. ............ G10H 1/0008 345/173 |
| 5,627,567 A | | 5/1997 | Davidson |
| 5,638,501 A | | 6/1997 | Gough et al. |
| 5,825,352 A | | 10/1998 | Bisset et al. |
| 5,835,079 A | | 11/1998 | Shieh |
| 5,869,791 A | | 2/1999 | Young |
| 5,943,052 A | | 8/1999 | Allen et al. |
| 5,982,355 A | * | 11/1999 | Jaeger ................ G02F 1/13306 345/161 |
| 6,040,824 A | | 3/2000 | Maekawa et al. |
| 6,072,475 A | | 6/2000 | van Ketwich |
| 6,072,489 A | | 6/2000 | Gough et al. |
| 6,073,036 A | | 6/2000 | Heikkinen et al. |
| 6,104,384 A | | 8/2000 | Moon et al. |
| 6,121,960 A | | 9/2000 | Carroll et al. |
| 6,208,329 B1 | | 3/2001 | Ballare |
| 6,229,529 B1 | | 5/2001 | Yano et al. |
| 6,259,436 B1 | | 7/2001 | Moon et al. |
| 6,323,846 B1 | * | 11/2001 | Westerman ............ G06F 3/0235 345/173 |
| 6,323,848 B1 | | 11/2001 | Abe |
| 6,492,978 B1 | * | 12/2002 | Selig .................. G06F 3/04886 345/168 |
| 6,507,338 B1 | | 1/2003 | Liao et al. |
| 6,570,078 B2 | | 5/2003 | Ludwig |
| 6,610,936 B2 | * | 8/2003 | Gillespie ............. G06F 3/03547 178/18.01 |
| 6,762,752 B2 | | 7/2004 | Perski et al. |
| 6,775,380 B2 | | 8/2004 | Su |
| 6,888,536 B2 | | 5/2005 | Westerman et al. |
| 6,982,695 B1 | | 1/2006 | Canova et al. |
| 6,995,752 B2 | | 2/2006 | Lu |
| 7,002,557 B2 | | 2/2006 | Iizuka et al. |
| 7,015,894 B2 | | 3/2006 | Morohoshi |
| 7,046,235 B2 | | 5/2006 | Katoh |
| 7,084,859 B1 | | 8/2006 | Pryor |
| 7,106,286 B2 | | 9/2006 | Baba et al. |
| 7,307,623 B2 | | 12/2007 | Enomoto |
| 7,486,272 B2 | | 2/2009 | Lo |
| 7,643,006 B2 | | 1/2010 | Hill et al. |
| 7,713,348 B2 | | 5/2010 | Kijima et al. |
| 7,743,348 B2 | | 6/2010 | Robbins et al. |
| 7,925,996 B2 | | 4/2011 | Hofmeister et al. |
| 8,144,271 B2 | | 3/2012 | Han |
| 8,239,784 B2 | | 8/2012 | Hotelling et al. |
| 8,259,240 B2 | | 9/2012 | Han |
| 8,269,729 B2 | | 9/2012 | Han et al. |
| 8,294,685 B2 | | 10/2012 | Weiss et al. |
| 8,479,122 B2 | | 7/2013 | Hotelling et al. |
| 8,564,538 B2 | * | 10/2013 | Wadsworth ......... G06F 3/04886 345/168 |
| 8,599,141 B2 | * | 12/2013 | Soma .................. G06F 1/1616 345/173 |
| 9,024,884 B2 | * | 5/2015 | Lengeling ........... G06F 3/04847 345/173 |
| 2002/0005108 A1 | | 1/2002 | Ludwig |
| 2002/0054030 A1 | * | 5/2002 | Murphy ............... G06F 1/1626 345/173 |
| 2002/0118848 A1 | | 8/2002 | Karpenstein |
| 2002/0191029 A1 | | 12/2002 | Gillespie et al. |
| 2003/0028382 A1 | * | 2/2003 | Chambers ............. G10L 15/26 704/275 |
| 2003/0063073 A1 | | 4/2003 | Geaghan et al. |
| 2003/0128191 A1 | | 7/2003 | Strasser et al. |
| 2003/0132950 A1 | | 7/2003 | Surucu et al. |
| 2003/0164820 A1 | | 9/2003 | Kent |
| 2003/0197687 A1 | | 10/2003 | Shetter |
| 2004/0001048 A1 | | 1/2004 | Kraus et al. |
| 2004/0021644 A1 | | 2/2004 | Enomoto |
| 2004/0056781 A1 | * | 3/2004 | Rix ....................... G06F 3/0202 341/20 |
| 2004/0056849 A1 | * | 3/2004 | Lohbihler ............... G06F 3/046 345/173 |
| 2006/0026385 A1 | | 2/2006 | Dinechin et al. |
| 2006/0026521 A1 | | 2/2006 | Hotelling et al. |
| 2006/0026536 A1 | | 2/2006 | Hotelling et al. |
| 2006/0097991 A1 | | 5/2006 | Hotelling et al. |
| 2006/0238518 A1 | | 10/2006 | Westerman et al. |
| 2006/0256090 A1 | | 11/2006 | Huppi |
| 2007/0198926 A1 | | 8/2007 | Joguet et al. |

FOREIGN PATENT DOCUMENTS

| | | |
|---|---|---|
| EP | 1014295 A2 | 6/2000 |
| GB | 2178570 A | 2/1987 |
| GB | 2330670 A | 4/1999 |
| GB | 2351215 A | 12/2000 |
| JP | 2000-222130 A | 8/2000 |
| WO | 1995/031817 A1 | 11/1995 |
| WO | 1998/007127 A1 | 2/1998 |
| WO | 1999/038149 A1 | 7/1999 |
| WO | 2001/069399 A2 | 9/2001 |
| WO | 2003/041006 A1 | 5/2003 |
| WO | 2003/088164 A1 | 10/2003 |

OTHER PUBLICATIONS

Office Action received for European Patent Application No. 05254654.6, dated Aug. 10, 2006, 1 page.
Office Action received for European Patent Application No. 05254654.6, dated Nov. 25, 2009, 4 pages.
Office Action received for European Patent Application No. 05254654.6, dated Oct. 2, 2013, 4 pages.
Extended European Search Report (includes Partial European Search Report and European Search Opinion) received for European Patent Application No. 10177107.9, dated Nov. 10, 2014, 12 pages.
Final Office Action received for U.S. Appl. No. 11/015,978, dated Dec. 14, 2009, 5 pages.
Final Office Action received for U.S. Appl. No. 11/015,978, dated Mar. 15, 2012, 12 pages.
Final Office Action received for U.S. Appl. No. 11/015,978, dated Oct. 4, 2013, 13 pages.
Final Office Action received for U.S. Appl. No. 11/015,978, dated Oct. 12, 2010, 11 pages.
Non-Final Office Action received for U.S. Appl. No. 11/015,978, dated Apr. 17, 2014, 9 pages.
Non-Final Office Action received for U.S. Appl. No. 11/015,978, dated Jun. 8, 2010, 9 pages.
Non-Final Office Action received for U.S. Appl. No. 11/015,978, dated Jun. 15, 2009, 10 pages.
Non-Final Office Action received for U.S. Appl. No. 11/015,978, dated Jun. 24, 2011, 11 pages.
Non-Final Office Action received for U.S. Appl. No. 11/015,978, dated Mar. 7, 2011, 11 pages.
Non-Final Office Action received for U.S. Appl. No. 11/015,978, dated Sep. 21, 2012, 10 pages.
Notice of Allowance received for U.S. Appl. No. 11/015,978, dated Apr. 8, 2015, 2 pages.

(56) References Cited

OTHER PUBLICATIONS

Notice of Allowance received for U.S. Appl. No. 11/015,978, dated Dec. 19, 2014, 9 pages.

* cited by examiner

TOUCH-SENSITIVE ELECTRONIC APPARATUS FOR MEDIA APPLICATIONS, AND METHODS THEREFOR

CROSS-REFERENCE TO RELATED APPLICATIONS

This application is a continuation of U.S. patent application Ser. No. 11/015,978, filed Dec. 17, 2004, now U.S. Pat. No. 9,024,884, issued on May 5, 2015, which claims the benefit of U.S. Provisional Patent Application No. 60/592,483, filed Jul. 30, 2004, entitled "TOUCH SENSITIVE TECHNIQUES AND INPUT DEVICES," which is hereby incorporated herein by reference.

This application is also related to: (i) U.S. patent application Ser. No. 10/840,862, filed May 6, 2004, entitled "MULTIPOINT TOUCHSCREEN," which is hereby incorporated herein by reference; (ii) U.S. patent application Ser. No. 10/903,964, filed Jul. 30, 2004, entitled "GESTURES FOR TOUCH SENSITIVE INPUT DEVICES," which is hereby incorporated herein by reference; and (iii) U.S. patent application Ser. No. 10/654,108, filed Sep. 2, 2003, entitled "AMBIDEXTROUS MOUSE," which is hereby incorporated herein by reference.

BACKGROUND OF THE INVENTION

Field of the Invention

The present invention relates to electronic devices and, more particularly, to touch-sensitive electronic devices.

Description of the Related Art

Mixing boards or consoles are known and used in sound production. The mixing boards or consoles are dedicated devices that primarily amplify and equalize signals on various channels. A mixing board or console can, for example, support a large number of channels, such as 24 or 32 channels. Users are often intimidated by the many knobs, switches and sliders that are compactly provided on the mixing board or console.

Traditionally, the knobs, switches and sliders are manually manipulated by the user of the mixing board or console. However, more recently, mixing boards or consoles have permitted some of its controls (e.g., faders, equalizers) to be automatically adjusted, such as during a playback. Furthermore, in recent years, mixing board or consoles have become more digital, such as by including a small display screen in the mixing board or console. Also, in recent years, software programs that execute on general purpose computer, such as GarageBand™ and Logic Pro 6™ from Apple Computer, Inc., permit mixing capabilities for sound productions.

Unfortunately, however, these conventional approaches do not fully satisfy user needs. For example, the traditional mixing consoles tend to be fixed and inflexible. As another example, the software applications tend to provide greater flexibility but have limitations with respect to user interaction. Thus, there is a need for improved approaches to providing digital mixing boards or consoles.

SUMMARY OF THE INVENTION

Broadly speaking, the invention relates to an electronic apparatus for media applications, such as an electronic mixing apparatus or an electronic keyboard apparatus, as well as associated methods for use of the electronic apparatus.

According to one aspect of the invention, the electronic mixing apparatus is provided on a touch screen that provides user input and display capabilities. In one embodiment, the touch screen is a multipoint touch screen so that multiple user touch inputs can be simultaneously acquired. The touch screen can display a Graphical User Interface (GUI) having mixing controls that can be selected and manipulated through user touch inputs with the touch screen. In one embodiment, the mixing controls being displayed with the GUI can be modified in real time as a user provides touch inputs with the touch screen.

Another aspect of the invention pertains to surface guides that are provided on the touch screen to assist with user input. The surface guides can be a permanent part of the touch screen or a removable part of the touch screen. In one embodiment, the surface guides can be part of an overlay sheet that can be affixed to the touch screen.

Still another aspect of the invention pertains to an electronic keyboard apparatus. The electronic keyboard apparatus (e.g., virtual keyboard) is provided on a touch-sensitive apparatus capable of simultaneously acquiring multiple user touch inputs.

The invention can be implemented in numerous ways, including as a method, system, device, apparatus, or computer readable medium. Several embodiments of the invention are discussed below.

As a touch-sensitive apparatus operating as a media mixer, one embodiment of the invention includes at least: a touch screen having a display area that also operates as a touch input area; and a plurality of media mixing controls being displayed in the display area of the touch screen and being interactive with a user through interaction with the touch input area of the touch screen.

As a method for operating a computing device having a touch screen, one embodiment of the invention includes at least the acts of: displaying a mixing console Graphical User Interface (GUI) having a plurality of GUI objects on the touch screen; determining whether at least one touch input has been detected; identifying the one or more GUI objects that are associated with the at least one touch input; determining modifications to the one or more identified GUI objects based on the at least one touch input; updating the one or more identified GUI objects of the mixing console GUI to reflect the modifications; and determining input data based on the at least one touch input and the one or more identified GUI objects.

As an electronic media mixer, one embodiment of the invention includes at least: a multi-touch touch screen capable of concurrently receiving multiple touch inputs; and a computing device operatively connected to the multi-touch touch screen. The computing device is configured to: display a mixing console Graphical User Interface (GUI) having a plurality of GUI objects on the multi-touch touch screen; determine whether at least one touch input has been detected; identify the one or more GUI objects that are associated with the at least one touch input; determine modifications to the one or more identified GUI objects based on the at least one touch input; update the one or more identified GUI objects of the mixing console GUI to reflect the modifications; and determine input data based on the at least one touch input and the one or more identified GUI objects.

As a touch-sensitive apparatus operating as an electronic keyboard, one embodiment of the invention includes at least: a touch screen having a display area that also operates as a touch input area; and a plurality of keyboard keys being displayed in the display area of the touch screen and being interactive with a user through interaction with the touch input area of the touch screen.

As a method for operating a computing device having a touch screen, one embodiment of the invention includes at least the acts of: displaying a keyboard Graphical User Interface (GUI) having a plurality of keys on the touch screen; determining whether at least one touch input has been detected; identifying the one or more keys that are associated with the at least one touch input; determining modifications to the one or more identified keys based on the at least one touch input; updating the one or more identified keys of the keyboard GUI to reflect the modifications; and determining input data based on the at least one touch input and the one or more identified keys.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to an electronic apparatus for media applications, such as an electronic mixing apparatus or an electronic keyboard apparatus, as well as associated methods for use of the electronic apparatus.

According to one aspect of the invention, the electronic mixing apparatus is provided on a touch screen that provides user input and display capabilities. In one embodiment, the touch screen is a multipoint touch screen so that multiple user touch inputs can be simultaneously acquired. The touch screen can display a Graphical User Interface (GUI) having mixing controls that can be selected and manipulated through user touch inputs with the touch screen. In one embodiment, the mixing controls being displayed with the GUI can be modified in real time as a user provides touch inputs with the touch screen.

Another aspect of the invention pertains to surface guides that are provided on the touch screen to assist with user input. The surface guides can be a permanent part of the touch screen or a removable part of the touch screen. In one embodiment, the surface guides can be part of an overlay sheet that can be affixed to the touch screen.

Still another aspect of the invention pertains to an electronic keyboard apparatus. The electronic keyboard apparatus (e.g., virtual keyboard) is provided on a touch-sensitive apparatus capable of simultaneously acquiring multiple user touch inputs.

Embodiments of the invention are discussed below with reference to FIGS. 1-5. However, those skilled in the art will readily appreciate that the detailed description given herein with respect to these figures is for explanatory purposes as the invention extends beyond these limited embodiments.

Figure 1:
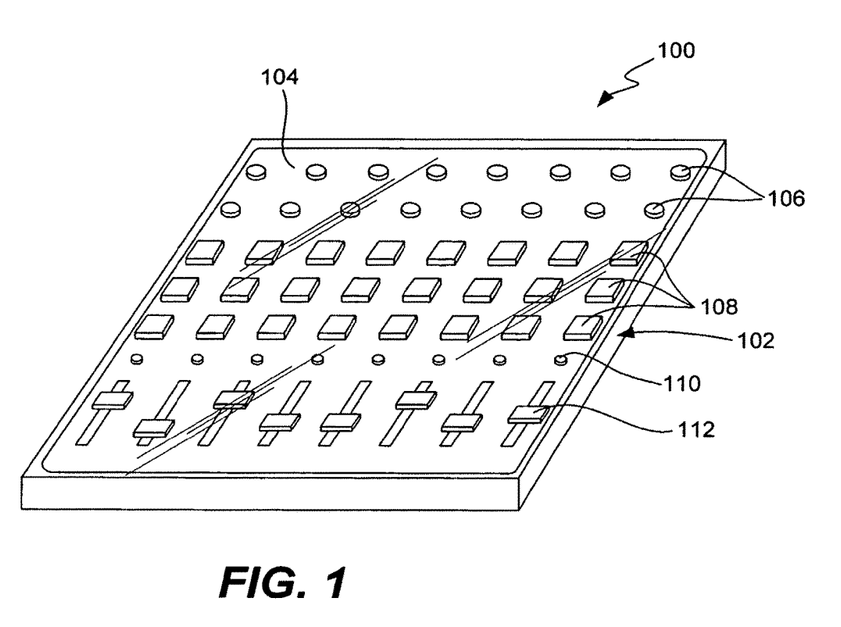
FIG. 1 is a diagram of a computing device according to one embodiment of the invention.

FIG. 1 is a diagram of a computing device 100 according to one embodiment of the invention. The computing device 100 has a housing 102 that contains components and circuitry for computer processing by the computing device 100. In addition, the housing 102 has a touch screen 104. The touch screen 104 not only serves as an output device, such as a display screen, but also serves as an input device by way of a touch-sensitive surface provided over the display device. In one embodiment, the touch screen 104 is a multi-point touch screen that is capable of simultaneously receiving multiple touch inputs.

The computing device 100 can be a special purpose computing device or a general purpose computing device. The size and configuration of the computing device 100 can also vary. As an example, the computing device 100 can pertain to a tablet computer which integrally combines computer components with a touch screen into a tablet-like form factor.

In any case, when the computing device 100 is operating, the touch screen 104 can display media mixing controls. For example, the computing device 100 can execute a media mixing software application that provides media mixing functionality to the computing device 100. The media mixing controls are utilized to facilitate user input of media mixing operations that are supported by the media mixing, software application. Hence, the computing device 100 can be a central component of a media mixing system. The media mixing system would provide media inputs to the computing device 100 and would receive media outputs provided by the computing device 100. The touch screen 104 of the computing device 100 displays the media mixing controls on the touch screen 104. Hence, the media mixing controls are virtual controls that are graphically displayed by the touch screen 104 but are not physically present. Nevertheless, a user of the computing device 100 can interact with the media mixing controls to effectuate media mixing operations.

More particularly, as shown in FIG. 1, the media mixing controls displayed on the touch screen 104 can include a plurality of dials 106, a plurality of buttons 108, a plurality of status indicators 110, and sliders 112. Using the touch screen 104, a user could interact with one of the dials 106 so as to effectively rotate the dial to provide a media mixing operation. For example, the dial 106 being rotated could pertain to an equalizer level, a filter cut frequency, a trim amount, a pan amount, etc. Additionally, the user can interact with the touch screen 104 to select or deselect one of the buttons 108. For example, the buttons 108 can correspond to channel selection, mute, polarity, etc. The status indicators 110 can indicate status of an aspect of media mixing. For example, the status indicators 110 can indicate power-on, button selected, channel utilized, etc. The sliders 112 can be selected by the user and then slid up or down. For example, the sliders 112 can be used as faders, such as for volume or signal level control.

As the media mixing controls are manipulated by the user through interaction with the touch screen 104, the media mixing controls being displayed can be modified in real time. For example, as the user interacts with the dial 106 via the touch screen 104, the graphics associated with the dial 106 can be modified to indicate that the dial is effectively rotating. Similarly, by selection of one of the buttons 108, the graphics associated with the button 108 on the touch screen 104 can indicate its selection. As another example, the user manipulates the slider 112 and the graphics associated with the slider 112 can be modified as the slider 112 is manipulated. Hence, as the media mixing controls displayed by the touch screen 104 are manipulated a user, the user is essentially given immediate media feedback as to the manner by which the media mixing controls are being manipulated.

Still further, since the touch screen 104 is capable of multi-point touch sensing, a user (or a plurality of users) can simultaneously interact with more than one of the media mixing controls at any given point in time. For example, the user may concurrently manipulate one or more dials 106, buttons 108 or sliders 112, or any combination thereof. The multi-point touch screen 104 can simultaneously sense these different interactions with different media mixing controls so that the appropriate media mixing controls are able to not only be concurrently sensed but also have their graphical display modified.

Figure 2A:
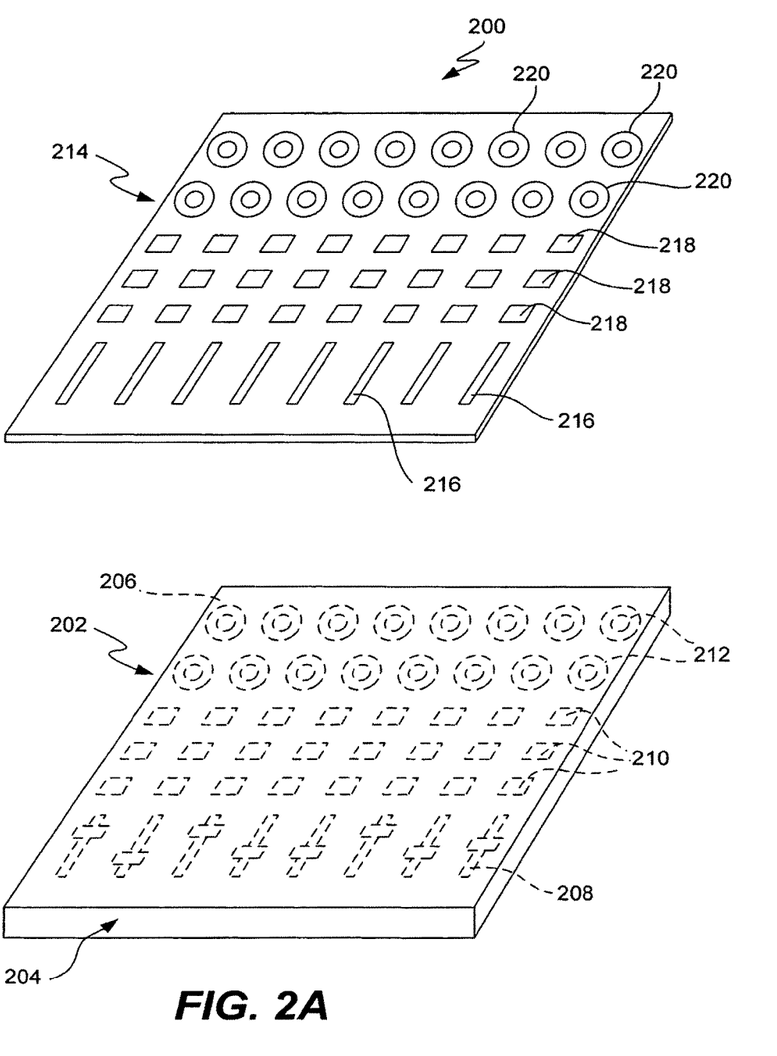
FIG. 2A is a diagram of an electronic mixing console according to one embodiment of the invention.
Figure 2B:
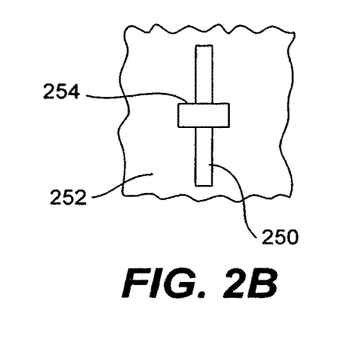
FIGS. 2B-2D are diagrams illustrating operations of a slider according to one embodiment of the invention.

FIG. 2A is a diagram of an electronic mixing console 200 according to one embodiment of the invention. The electronic mixing console 200 includes a computing device 202 that has a housing 204. The housing 204 contains the circuitry and components for the computing device 202. The housing 204 also includes a touch screen 206 that provides a screen for output information as well as a touch-sensitive area for data input. The touch screen 206 of the computing device 202 can display media mixing controls, such as sliders 208 (e.g., faders), buttons 210 and dials 212. These media mixing controls are not physically presented on the computing device 202 but are graphically depicted by the touch screen 206.

In addition, the electronic mixing console 200 includes an overlay 214. The overlay 214 is designed to be placed over the touch screen 206 of the computing device 202. The overlay 214 is provided on the computing device 202 so as to render the computing device 202 more applicable to use as a mixing console. In this regard, the overlay 214 includes various surface guides. For example, as shown in FIG. 2A, the surface guides can include slider guides 216, button guides 218 and dial guides 220. The slider guides 216 assist the user with interacting with the sliders 208. The button guides 218 assist the user with interaction with the buttons 210. The dial guides 220 assist the user with interacting with the dials 212.

The overlay 214 can be formed from a variety of different materials. In one embodiment, the overlay 214 is a translucent, thin plastic sheet having the surface guides on an upper surface thereof. A back surface of the overlay 214 can then be affixed adjacent to the touch screen 206 of the computing device. The overlay 214 can be attached or held against the computing device 202 in a variety of different ways. For example, the overlay 214 can be attached or held against the computing device 202 by clips, pins, tabs, adhesive, static attraction, vacuum (e.g., suction cups). As other examples, the computing device 202 could include grooves or slots for receiving the overlay 214 and holding the same in position. In another embodiment, the overlay 214 can be permanently affixed to the touch screen 206 of the computing device 202.

The user's interaction with the touch screen 206 via the overlay 214 can be such that a user performs a gesture. For example, the user could utilize the dial guide 220 and perform a rotate gesture. The touch screen 206 of the computing device 202 would understand the touch gesture and cause the corresponding dial control 212 to be manipulated as well as to provide input data for processing by the computing device 202. Additional details on gesture recognition are provided in U.S. patent application Ser. No. 10/840,862, which has been incorporated herein by reference.

Figure 2C:
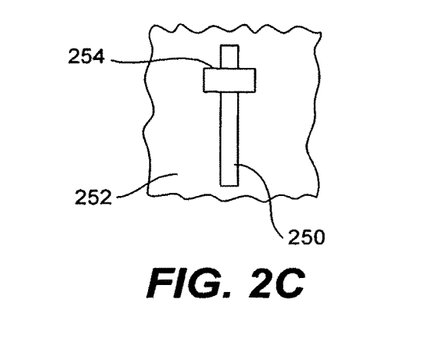
Figure 2D:
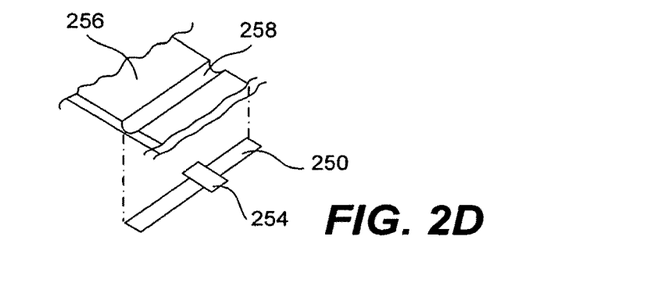

FIGS. 28-20 are diagrams illustrating operations of a slider according to one embodiment of the invention. The slider is, for example, suitable for use as one of the sliders shown in FIG. 1 or FIG. 2A. In FIG. 28, a slider includes a slider bar 250 depicted on a touch screen 252. A slider control 254 is provided on the slider bar 250. The user can interact and manipulate the position of the slider control 254 with respect to the slider bar 250. FIG. 2C illustrates the slider control 254 towards the top of the slider bar 250. FIG. 20 illustrates a portion of an overlay 256 having a guide groove 258 aligned over the slide bar 250. The guide groove 258 assists a user with interacting with the slider bar 250 by maintaining alignment with respect to the slider bar 250. Hence, the user can manipulate the slider bar 250 without having to visually coordinate one's finger or stylus position over the slider bar 250.

Figure 2E:
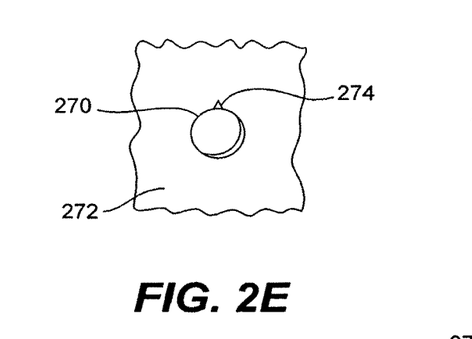
FIGS. 2E-2G are diagrams illustrating operations of a dial according to one embodiment of the invention.
Figure 2F:
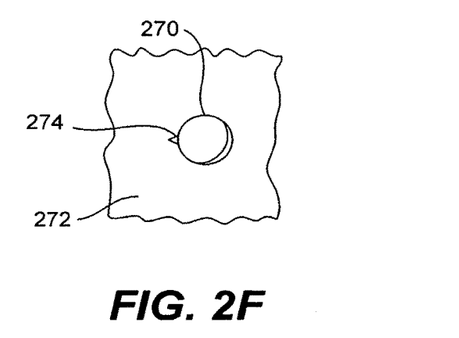
Figure 2G:
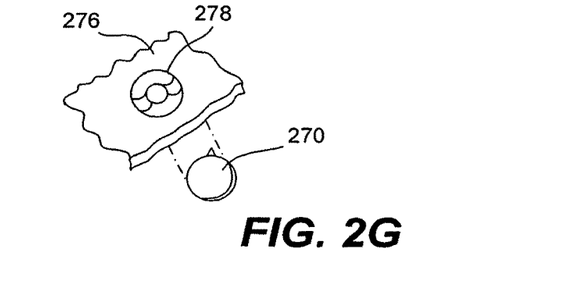

FIGS. 2E-2G are diagrams illustrating operations of a dial 270 according to one embodiment of the invention. The dial 270 is, for example, suitable for use as one of the dials shown in FIG. 1 or FIG. 2A. In FIG. 2E, the dial 270 is depicted on a touch screen 272. A position indicator 274 is provided on the dial 270. The user can interact and manipulate the position of the position indicator 274 with respect to the dial 270 by rotating the dial 270 through a rotational action or gesture with respect to the touch screen 272 at the position of the dial 270. FIG. 2E illustrates the position indicator 274 at an upward position, and FIG. 2F illustrates the position indicator 274 at a side position. Hence, the user can rotate the dial 270, through a rotational action or gesture with respect to the touch screen 272, such that the position indicator 274 moves from the upward position to the side position. FIG. 2G illustrates a portion of an overlay 276 having a dial guide 278 aligned over the dial 270. The dial guide 278 assists a user with interacting with the dial 270 by maintaining alignment with respect to the dial 270. Hence, the user can manipulate the dial 270 (e.g., a rotational action or gesture) without having to visually coordinate one's finger or stylus position over the dial 270.

Figure 3A:
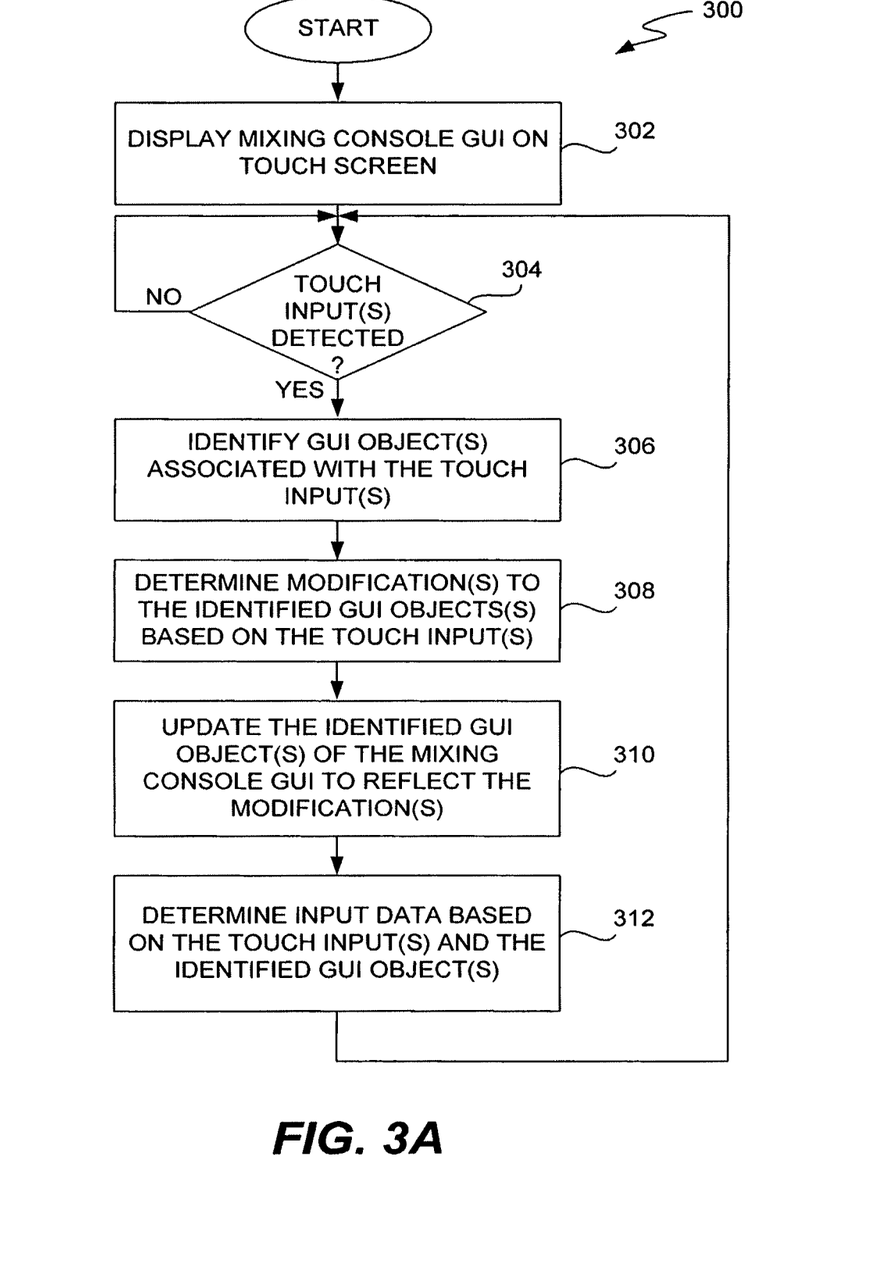
FIG. 3A is a flow diagram of a mixing console process according to one embodiment of the invention.

FIG. 3A is a flow diagram of a mixing console process 300 according to one embodiment of the invention. The mixing console process 300 is, for example, performed by the computing device 100 illustrated in FIG. 1 or the computing device 202 illustrated in FIG. 2A.

The mixing console process 300 initially displays 302 a mixing console Graphical User Interface (GUI) on a touch screen of a computing device. For example, in FIG. 1, various media mixing controls associated with a mixing console GUI are displayed on the touch screen 104 of the computing device 100. In one embodiment, a user can configure (e.g., move, arrange, or re-arrange) the various media mixing controls on the mixing console GUT. For example, the configuration adjustments can change the number of particular media mixing controls and their position with respect to the mixing console GUI.

After the mixing console GUI is displayed 302, a decision 304 determines whether one or more touch inputs have been detected. When the decision 304 determines that no touch inputs have been detected, the mixing console process 300 awaits such input.

Once the decision 304 determines that one or more touch inputs have been detected, the mixing console process 300 continues. Namely, the GUI object or objects associated with the one or more touch inputs are identified 306. Then, modifications to the identified GUI objects are determined 308 based on the touch inputs. Then, the identified GUI objects of the mixing console GUI are updated 310 to reflect the modifications. In addition, input data is determined 312 based on the touch inputs and the identified GUI objects. The operations 306-312 are rapidly performed at approximately the same time such that once a touch input is detected, the mixing console process 300 is able to not only determine 312 the input data but also update 310 the identified GUI objects being modified. Hence, the user is given the impression that the system is responsive to their input in an essentially real time manner.

It should also be noted that after the input data has been determined 312, the mixing console process 300 returns to repeat the decision 304 and subsequent blocks so that additional touch inputs can be similarly processed. However, it should be noted that once the input data has been determined 312, the computing device will operate to process the input data. For example, the input data might indicate that the rotation of a dial by the user is to cause the output volume on a given channel to be increased by 10%.

Figure 3B:
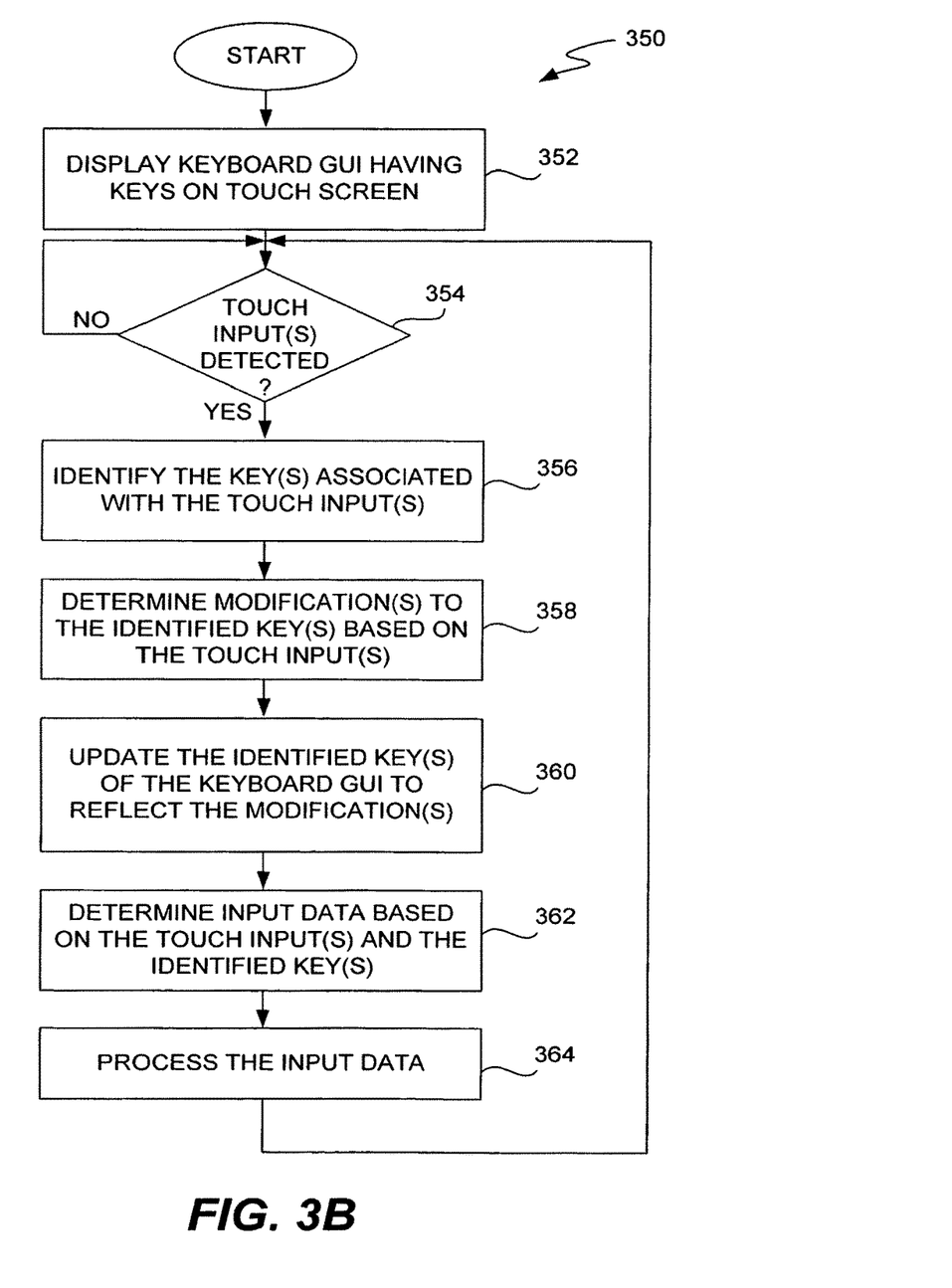
FIG. 3B is a flow diagram of a keyboard process according to one embodiment of the invention.

FIG. 3B is a flow diagram of a keyboard process 300 according to one embodiment of the invention. The keyboard process 300 is, for example, performed by the computing device 100 illustrated in FIG. 1 or the computing device 202 illustrated in FIG. 2A.

The keyboard process 300 initially displays 352 a keyboard graphical user interface (GUI) on a touch screen of a computing device. For example, the touch screen 104 of the computing device 100 can display a virtual keyboard having a plurality of keys, instead of the various media mixing controls associated with a mixing console GUI as shown in FIG. 1. After the keyboard GUI is displayed 352, a decision 354 determines whether one or more touch inputs have been detected. When the decision 354 determines that no touch inputs have been detected, the keyboard process 350 awaits such input.

Once the decision 354 determines that one or more touch inputs have been detected, the keyboard process 350 continues. Namely, the one or more keys associated with the one or more touch inputs are identified 356. Then, modifications to the identified keys are determined 358 based on the touch inputs. Then, the identified keys of the keyboard GUI are updated 360 to reflect the modifications. In addition, input data is determined 362 based on the touch inputs and the identified keys. The operations 356-362 are rapidly performed at approximately the same time such that once a touch input is detected, the keyboard process 350 is able to not only determine 362 the input data but also update 360 the identified keys being modified. Hence, the user is given the impression that the system is responsive to their input in an essentially real time manner.

It should also be noted that after the input data has been determined 362, the keyboard process 350 returns to repeat the decision 354 and subsequent blocks so that additional touch inputs can be similarly processed. However, it should be noted that once the input data has been determined 362, the computing device will operate to process the input data. For example, the input data might indicate that a user has interacted with the keyboard GUI to play a chord and thus cause the computing device 100 to recognize such and perhaps output an audio sound pertaining to the chord.

In one embodiment, the input data being determined 362 can indicate which of the keys of the virtual keyboard are selected (e.g., pressed) by the user. Optionally, the input data can further indicate characteristics of the one or more touch inputs associated with the selection of such keys. For example, the characteristics can pertain to pressure and velocity. These characteristics can be used to characterize the one or more touch inputs, such as "hard" or "soft," for example. These characteristics can then in turn affect the audio sound being output be the computing device 100. In one embodiment, for a touch screen, pressure and velocity can be monitored through examination area and timing of touch inputs. For additional details, see U.S. patent application Ser. No. 10/840,862, which has been incorporated herein by reference; and U.S. patent application Ser. No. 10/654,108. which has been incorporated herein by reference.

In another embodiment. the virtual keyboard can also make use of surface guides to assist the user. Surface guides were discussed above with respect to a mixing console but can also assist users of virtual keyboards in understanding the position of the keys without having to look at the keyboard GUI.

Figure 4:
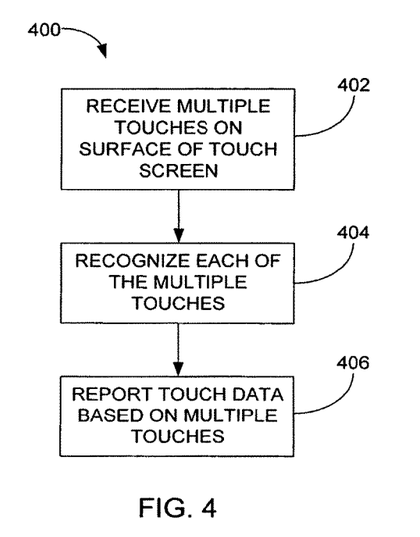
FIG. 4 is a multipoint touch method according to one embodiment of the invention.

FIG. 4 is a multipoint touch method 400 according to one embodiment of the invention. The method 400 generally begins at block 402 where multiple touches are received on the surface of the touch screen at the same time. This may, for example, be accomplished by placing multiple fingers on the surface of the touch screen. Following block 402, the process flow proceeds to block 404 where each of the multiple touches is separately recognized by the touch screen. This may, for example, be accomplished by multipoint capacitance sensors located within the touch screen. Following block 404, the process flow proceeds to block 406 where the touch data based on multiple touches is reported. The touch data may, for example, be reported to a host device such as a general purpose computer.

Figure 5:
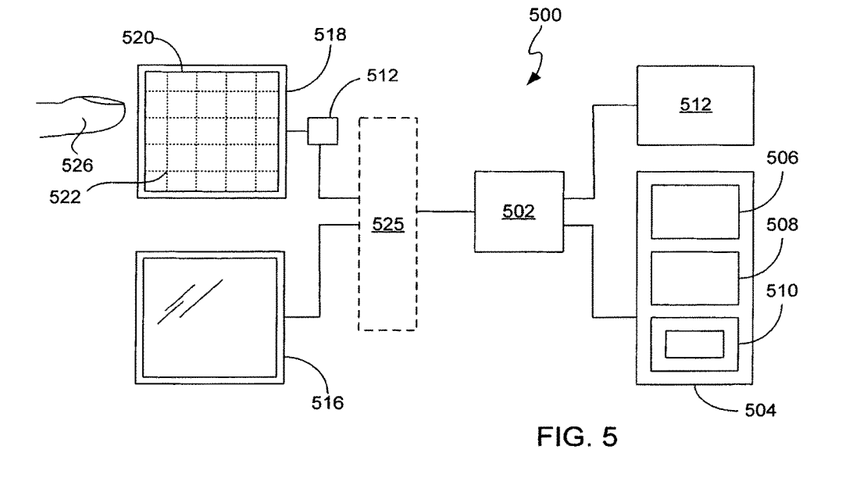
FIG. 5 is a block diagram of a computer system according to one embodiment of the invention.

FIG. 5 is a block diagram of a computer system 500 according to one embodiment of the invention. The computer system 500 may correspond to personal computer systems such as desktops, laptops, tablets or handhelds. By way of example, the computer system 500 may correspond to any Apple or PC based computer system. The computer system may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

As shown, the computer system 500 includes a processor 502 configured to execute instructions and to carry out operations associated with the computer system 500. For example, using instructions retrieved from memory, the processor 502 may control the reception and manipulation of input and output data between components of the computing system 500. The processor 502 can be a single-chip processor or can be implemented with multiple components.

In most cases. the processor 502 together with an operating system operates to execute computer code and produce and use data. The computer code and data may reside within a program storage block 504 that is operatively coupled to the processor 502. Program storage block 504 generally provides a place to hold data that is being used by the computer system 500. By way of example. the program storage block may include Read-Only Memory (ROM) 506. Random-Access Memory (RAM) 508, hard disk drive 510 and/or the like. The computer code and data could also reside on a removable storage medium and be loaded or installed onto the computer system when needed. Removable storage mediums include, for example, CD-ROM, PC-CARD, floppy disk, magnetic tape, and a network component.

The computer system 500 also includes an input/output (I/O) controller 512 that is operatively coupled to the processor 502. The (I/O) controller 512 may be integrated with the processor 502 or it may be a separate component as shown. The I/O controller 512 is generally configured to control interactions with one or more I/O devices. The I/O controller 512 generally operates by exchanging data between the processor and the I/O devices that desire to communicate with the processor 502. The I/O devices and the I/O controller 512 typically communicate through a data link 514. The data link 514 may be a one way link or two way link. In some cases, the I/O devices may be connected to the I/O controller 512 through wired connections. In other cases, the I/O devices may be connected to the I/O controller 512 through wireless connections. By way of example, the data link 514 may correspond to PS/2, USB, FIREWIRE, IR, RF, Bluetooth or the like.

The computer system 500 also includes a display device 516 that is operatively coupled to the processor 502. The processor 502 can drive the display device 516 or a separate display driver 525 can be used. The display device 516 may be a separate component (peripheral device) or it may be integrated with a base computer system to form a desktop computer (all in one machine), a laptop, handheld or tablet or the like. The display device 516 is configured to display a graphical user interface (GUI) including perhaps a pointer or cursor as well as other information to the user. By way of example, the display device 516 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The computer system 500 also includes a touch screen 518 that is operatively coupled to the processor 502. The touch screen 518 is a transparent panel that is positioned in front of the display device 516. The touch screen 518 may be integrated with the display device 516 or it may be a separate component. The touch screen 518 is configured to receive input from a user's touch and to send this information to the processor 502. In most cases, the touch screen 518 recognizes touches and the position and magnitude of touches on its surface. The touch screen 518 reports the touches to the processor 502 and the processor 502 interprets the touches in accordance with its programming. For example, the processor 502 may initiate a task in accordance with a particular touch.

In accordance with one embodiment, the touch screen 518 is capable of tracking multiple objects, which rest on, tap on, or move across the touch sensitive surface of the touch screen at the same time. The multiple objects may for example correspond to fingers and palms. Because the touch screen is capable of tracking multiple objects, a user may perform several touch-initiated tasks at the same time. For example, the user may select an onscreen button with one finger, while moving a cursor with another finger. In addition, a user may move a scroll bar with one finger while selecting an item from a menu with another finger. Furthermore, a first object may be dragged with one finger while a second object may be dragged with another finger. Moreover, gesturing may be performed with more than one finger.

To elaborate, the touch screen 518 generally includes a sensing device 520 configured to detect an object in close proximity thereto and/or the pressure exerted thereon. The sensing device 520 may be widely varied. In one particular embodiment, the sensing device 520 is divided into several independent and spatially distinct sensing points, nodes or regions 522 that are positioned throughout the touch screen 518. The sensing points 522, which are typically hidden from view, are dispersed about the touch screen 518 with each sensing point 522 representing a different position on the surface of the touch screen 518 (or touch screen plane). The sensing points 522 may be positioned in a grid or a pixel array where each pixilated sensing point 522 is capable of generating a signal at the same time. In the simplest case, a signal is produced each time an object is positioned over a sensing point 522. When an object is placed over multiple sensing points 522 or when the object is moved between or over multiple sensing points 522, multiple signals are generated.

The number and configuration of the sensing points 522 may be widely varied. The number of sensing points 522 generally depends on the desired sensitivity as well as the desired transparency of the touch screen 518. More nodes or sensing points generally increases sensitivity, but reduces transparency (and vice versa). With regard to configuration, the sensing points 522 generally map the touch screen plane into a coordinate system such as a Cartesian coordinate system, a Polar coordinate system, or some other coordinate system. When a Cartesian coordinate system is used (as shown), the sensing points 522 typically correspond to x and y coordinates. When a Polar coordinate system is used, the sensing points typically correspond to radial (r) and angular coordinates (θ).

The touch screen 518 may include a sensing circuit 524 that acquires the data from the sensing device 520 and that supplies the acquired data to the processor 502. Alternatively, the processor 502 or a separate touch screen driver/interface 525 may include this functionality. In one embodiment, the sensing circuit 524 is configured to send raw data to the processor 502 so that the processor 502 processes the raw data. For example, the processor 502 receives data from the sensing circuit 524 and then determines how the data is to be used within the computer system 500. The data may include the coordinates of each sensing point 522 as well as the pressure exerted on each sensing point 522. In another embodiment, the sensing circuit 524 is configured to process the raw data itself. That is, the sensing circuit 524 reads the pulses from the sensing points 522 and turns them into data that the processor 502 can understand. The sensing circuit 524 may perform filtering and/or conversion processes. Filtering processes are typically implemented to reduce a busy data stream so that the processor 502 is not overloaded with redundant or non-essential data. The conversion processes may be implemented to adjust the raw data before sending or reporting them to the processor 502. The conversions may include determining the center point for each touch region (e.g., centroid).

The sensing circuit 524 may include a storage element for storing a touch screen program, which is capable of controlling different aspects of the touch screen 518. For example, the touch screen program may contain what value(s) to output based on the sensing points 522 selected (e.g., coordinates). In fact, the sensing circuit in conjunction with the touch screen program may follow a predetermined communication protocol. As is generally well known, communication protocols are a set of rules and procedures for exchanging data between two devices. Communication protocols typically transmit information in data blocks or packets that contain the data to be transmitted, the data required to direct the packet to its destination, and the data that corrects errors that occur along the way. By way of example, the sensing circuit may place the data in a HID format (Human Interface Device).

The sensing circuit 524 generally includes one or more microcontrollers, each of which monitors one or more sensing points 522. The microcontrollers may, for example, correspond to an Application Specific Integrated Circuit (ASIC), which works with firmware to monitor the signals from the sensing device 520 and to process the monitored signals and to report this information to the processor 502.

In accordance with one embodiment, the sensing device 520 is based on capacitance. As should be appreciated, whenever two electrically conductive members come close to one another without actually touching, their electric fields interact to form capacitance. In most cases, the first electrically conductive member is a sensing point 522 and the second electrically conductive member is an object 526 such as a finger. As the object 526 approaches the surface of the touch screen 518, a tiny capacitance forms between the object 526 and the sensing points 522 in close proximity to the object 526. By detecting changes in capacitance at each of the sensing points 522 and noting the position of the sensing points, the sensing circuit can recognize multiple objects, and determine the location, pressure, direction, speed and acceleration of the objects 80 as they are moved across the touch screen 70. For example, the sensing circuit can determine when and where each of the fingers and palm of one or more hands are touching as well as the pressure being exerted by the finger and palm of the hand(s) at the same time.

The simplicity of capacitance allows for a great deal of flexibility in design and construction of the sensing device 520. By way of example, the sensing device 520 may be based on self capacitance or mutual capacitance. In self capacitance, each of the sensing points 522 is provided by an individually charged electrode. As an object approaches the surface of the touch screen 518, the object capacitive couples to those electrodes in close proximity to the object thereby stealing charge away from the electrodes. The amount of charge in each of the electrodes is measured by the sensing circuit 524 to determine the positions of multiple objects when they touch the touch screen 518. In mutual capacitance, the sensing device 520 includes a two layer grid of spatially separated lines or wires. In the simplest case, the upper layer includes lines in rows while the lower layer includes lines in columns (e.g., orthogonal). The sensing points 522 are provided at the intersections of the rows and columns. During operation, the rows are charged and the charge capacitively couples to the columns at the intersection. As an object approaches the surface of the touch screen, the object capacitive couples to the rows at the intersections in close proximity to the object thereby stealing charge away from the rows and therefore the columns as well. The amount of charge in each of the columns is measured by the sensing circuit 524 to determine the positions of multiple objects when they touch the touch screen 518.

The various aspects, embodiments, implementations or features of the invention can be used separately or in any combination.

The invention is preferably implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that an electronic mixer for media items can be provided using a computing device having a touch screen. Another advantage of the invention is that an electronic mixer with complete capabilities can be provided without having any mechanical moving parts. Still another advantage of the invention is that an electronic keyboard for media items can be provided using a computing device having a touch screen. Yet still another advantage of the invention is that a computing device having a touch screen can be configured for multiple purposes, one of which can be as an electronic mixer and another of which can be as an electronic keyboard.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A method comprising:
   at an electronic device with a touch- screen and a processor:
      displaying, on the touch screen, a graphical user interface that includes a plurality of media controls displayed on the touch-screen;
      while displaying the plurality of media controls on the touch screen, detecting a gesture on the touch-screen at a location that corresponds to a respective media control of the plurality of media controls, wherein the gesture is a touch gesture; and
      in response to detecting the gesture on the touch screen:
         in accordance with a determination that the gesture meets first pressure criteria, performing a first media operation associated with the respective media control, wherein the first pressure criteria include a criterion that is met when a pressure from one or more finger contacts of the gesture on the display is less than a respective pressure threshold; and
         in accordance with a determination that the gesture meets second pressure criteria different from the first pressure criteria, performing a second media operation associated with the respective control that is different from the first media operation, wherein the second pressure criteria include a criterion that is met when a pressure from one or more finger contacts of the gesture on the display is greater than the respective pressure threshold.

2. The method of claim 1, wherein:
performing the first media operation comprises changing a first characteristic of audio signal output by the device, and performing the second media operation comprises changing a second characteristic of the audio signal output by the device, the second characteristic being different from the first characteristic.

3. The method of claim 2, wherein the first characteristic of the audio signal output by the device comprises at least one of:
a volume level
an equalizer level;
a filter cut frequency; and
a trim amount.

4. The method of claim 2, wherein the second characteristic of the audio signal output by the device comprises at least one of:
a volume level
an equalizer level;
a filter cut frequency; and
a trim amount.

5. The method of claim 1, wherein:
performing the first media operation associated with the respective media control comprises performing an operation associated with one of a dial, a slider, and a button displayed on the display of the device; and
performing the second media operation associated with the respective media control comprises performing an operation associated with one of a dial, a slider, and a button displayed on the display that is different from the respective media control associated with the first media operation.

6. The method of claim 1, wherein detecting the gesture on the touch screen includes determining a location and pressure of a contact on the touch screen display.

7. The method of claim 1, wherein detecting the gesture on the touch screen includes determining location, pressure, and velocity information for a plurality of contacts that are concurrently detected on the touch screen.

8. An electronic device, comprising:
a multi-point touch- screen;
a processor:
a memory comprising one or more programs including instructions, which when executed by the processor, cause the device to:
display, on the touch screen, a graphical user interface that includes a plurality of media controls displayed on the touch-screen;
while displaying the plurality of media controls on the touch screen, detect a gesture on the touch-screen at a location that corresponds to a respective media control of the plurality of media controls, wherein the gesture is a touch gesture; and
in response to detecting the gesture on the touch screen:
in accordance with a determination that the gesture meets first pressure criteria, perform a first media operation associated with the respective media control, wherein the first pressure criteria include a criterion that is met when a pressure from one or more finger contacts of the gesture on the display is less than a relative pressure threshold; and
in accordance with a determination that the gesture meets second pressure criteria different from the first pressure criteria, perform a second media operation associated with the respective media control that is different from the first media operation, wherein the second pressure criteria include a criterion that is met when a pressure from one or more finger contacts of the gesture on the display is greater than the relative pressure threshold.

9. The device of claim 8, wherein:
performing the first media operation comprises changing a first characteristic of audio signal output by the device, and
performing the second media operation comprises changing a second characteristic of the audio signal output by the device, the second characteristic being different from the first characteristic.

10. The device of claim 9, wherein the first characteristic of the audio signal output by the device comprises at least one of:
a volume level
an equalizer level;
a filter cut frequency; and
a trim amount.

11. The device of claim 9, wherein the second characteristic of the audio signal output by the device comprises at least one of:
a volume level
an equalizer level;
a filter cut frequency; and
a trim amount.

12. The device of claim 8, wherein:
performing the first media operation associated with the respective media control comprises performing an operation associated with one of a dial, a slider, and a button displayed on the display of the device; and
performing the second media operation associated with the respective media control comprises performing an operation associated with one of a dial, a slider, and a button displayed on the display that is different from the respective media control associated with the first media operation.

13. The device of claim 8, wherein detecting the gesture on the touch screen includes determining a location and pressure of a contact on the touch screen display.

14. The device of claim 8, wherein detecting the gesture on the touch screen includes determining location, pressure, and velocity information for a plurality of contacts that are concurrently detected on the touch screen.

15. A non-transitory computer readable medium comprising one or more computer programs, which when executed by an electronic device comprising a multi-point touch screen and a processor, cause the device to:
display, on the touch screen, a graphical user interface that includes a plurality of media controls displayed on the touch-screen;
while displaying the plurality of media controls on the touch screen, detect a gesture on the touch-screen at a location that corresponds to a respective media control of the plurality of media controls, wherein the gesture is a touch gesture; and
in response to detecting the gesture on the touch screen:
in accordance with a determination that the gesture meets first pressure criteria, perform a first media operation associated with the respective media control, wherein the first pressure criteria include a criterion that is met when a pressure from one or more finger contacts of the gesture on the display is less than a relative pressure threshold; and
in accordance with a determination that the gesture meets second pressure criteria different from the first pressure criteria, perform a second media operation associated with the respective control that is different from the first media operation, wherein the second pressure criteria include a criterion that is met when a pressure from one or more finger contacts of the gesture on the display is greater than the relative pressure threshold.

16. The medium of claim 15, wherein:
performing the first media operation comprises changing a first characteristic of audio signal output by the device, and
performing the second media operation comprises changing a second characteristic of the audio signal output by the device, the second characteristic being different from the first characteristic.

17. The medium of claim 16, wherein the first characteristic of the audio signal output by the device comprises at least one of:
a volume level
an equalizer level;
a filter cut frequency; and
a trim amount.

18. The medium of claim 16, wherein the second characteristic of the audio signal output by the device comprises at least one of:
a volume level
an equalizer level;
a filter cut frequency; and
a trim amount.

19. The medium of claim 15, wherein:
performing the first media operation associated with the respective media control comprises performing an operation associated with one of a dial, a slider, and a button displayed on the display of the device; and
performing the second media operation associated with the respective media control comprises performing an operation associated with one of a dial, a slider, and a button displayed on the display that is different from the respective media control associated with the first media operation.

20. The medium of claim 15, wherein detecting the gesture on the touch screen includes determining a location and pressure of a contact on the touch screen display.

21. The medium of claim 15, wherein detecting the gesture on the touch screen includes determining location, pressure, and velocity information for a plurality of contacts that are concurrently detected on the touch screen.

* * * * *